(12) United States Patent
Albertson

(10) Patent No.: US 11,819,995 B1
(45) Date of Patent: Nov. 21, 2023

(54) CHERRY PICKER RETRIEVAL DEVICE

(71) Applicant: David V Albertson, Mound, MN (US)

(72) Inventor: David V Albertson, Mound, MN (US)

( * ) Notice: Subject to any disclaimer, the term of this patent is extended or adjusted under 35 U.S.C. 154(b) by 0 days.

(21) Appl. No.: 18/108,340

(22) Filed: Feb. 10, 2023

Related U.S. Application Data

(60) Provisional application No. 63/395,768, filed on Aug. 5, 2022, provisional application No. 63/329,618, filed on Apr. 11, 2022, provisional application No. 63/309,498, filed on Feb. 11, 2022.

(51) Int. Cl.
*B25J 1/02* (2006.01)
*B25J 15/06* (2006.01)

(52) U.S. Cl.
CPC ............ *B25J 1/02* (2013.01); *B25J 15/0608* (2013.01)

(58) Field of Classification Search
CPC ....... B25J 1/02; B25J 15/0608; H01F 7/0257; A47L 13/41; B65D 63/1027; G01B 3/1084
USPC .................................................. 294/65.5, 190
See application file for complete search history.

(56) References Cited

U.S. PATENT DOCUMENTS

| | | | |
|---|---|---|---|
| 3,149,869 A | 9/1964 | Chamberlin | |
| 6,073,983 A * | 6/2000 | Schroeder | B65G 47/92 |
| | | | 7/164 |
| 6,663,153 B2 * | 12/2003 | Brunson | G01B 3/1071 |
| | | | 294/2 |
| 8,832,958 B2 * | 9/2014 | Mabey | G01B 3/1005 |
| | | | 33/758 |
| 9,266,654 B1 * | 2/2016 | Scott | B65D 63/1063 |
| 9,322,628 B2 * | 4/2016 | Burch | G01B 3/1056 |
| 10,767,971 B2 | 9/2020 | Zelenack et al. | |
| 2006/0168767 A1 | 8/2006 | Huang | |
| 2008/0276432 A1 | 11/2008 | McNeill | |
| 2019/0055977 A1 | 2/2019 | Gingold et al. | |
| 2021/0072010 A1 | 3/2021 | Khangar et al. | |

FOREIGN PATENT DOCUMENTS

| | | | | |
|---|---|---|---|---|
| CN | 213455193 U | 6/2021 | | |
| GB | 2372283 A * | 8/2002 | ......... | B65D 63/1027 |
| JP | 2001180739 A1 | 7/2001 | | |
| KR | 20200053165 A1 | 5/2020 | | |

* cited by examiner

*Primary Examiner* — Dean J Kramer
(74) *Attorney, Agent, or Firm* — Berggren Law Offices, LLC; William R Berggren

(57) ABSTRACT

An inanimate magnetically attractable object retrieval apparatus configured to retrieve small, inanimate, magnetically attractable objects from confining spaces with magnetic forces. The apparatus comprises a head comprising magnetic material permanently attached to a first end region of a flexible body that has a tail with a width and a length. The length is able to be reversibly bent in a 180 degree arc with a diameter of 1 inch only in a plane perpendicular to a plane containing the width and the length of the tail and unable to be reversibly bent in a 180 degree arc with a diameter of 1 inch in a plane parallel to the plane containing the width and the length of the tail.

20 Claims, 12 Drawing Sheets

US 11,819,995 B1

CHERRY PICKER RETRIEVAL DEVICE

FIELD OF THE INVENTION

This invention relates to a flexible device for retrieving small magnetically attractable objects in confining spaces.

BACKGROUND OF THE INVENTION

Frequently, small, typically inanimate magnetically attractable objects attracted to magnetics such as, for example, nuts, bolts, keys, paper clips, scissors, or glasses with magnetically attractable frames or screws, are mistakenly dropped in confining spaces where it is difficult to retrieve them. Such spaces are generally where hands are difficult to insert and include a range of spaces from, for example, within, behind, or beneath large machines standing or being repaired to between fixed items such seats within automobiles or circuits in circuit boards. Alternatively, sometimes an article such as an electrical cord may need to be threaded through an enclosed. Sometimes these objects comprise magnetically attractable elements attached to objects to make the objects magnetically attractable. Sometimes they are in dark recesses and sometimes they are in recesses that have some light to enable one to see the object.

There is a need for a flexible device with an end configures to magnetically adhere to such magnetically attractable objects with a magnetic force sufficient to permit the object to be retrieved with minimal time and frustration.

SUMMARY OF THE INVENTION

I have invented a flexible device with a magnetic end that is configured to retrieve small, inanimate, magnetically attractable objects from confining spaces with magnetic forces. The invention has two aspects: an article and a method of using the article.

The article is an inanimate magnetically attractable object retrieval apparatus that comprises a body and a head. The body comprises a first end region having a first side, a second side, a first length, a first end, a second end, and a first tail with a first end connected to the second end of the first end region, a second length of at least 3 inches, a first width with a third length, a first thickness with a fourth length that is no more than half of the third length, and a flexibility sufficient to enable the second length of the firsts tail to be reversibly bent in a 180 degree arc with a diameter of 1 inch only in a plane perpendicular to a plane containing the first width of the first tail and the second length of the first tail and unable to be reversibly bent in a 180 degree arc with a diameter of 1 inch in a plane parallel to the plane containing the first width of the first tail and the second length of the first tail. The head comprises an affixing element comprising a magnetic material with an affixing surface configured to removably affix with magnetic forces to an inanimate magnetically attractable object with sufficient first force to permit retrieval of the inanimate magnetically attractable object and an attaching element affixed to the affixing element of the head and configured to attach the affixing element of the head to the first end region of the body with a second force that is greater than the first force.

The method of using an object retrieval apparatus that comprises five steps. The first step is providing an inanimate magnetically attractable object to be retrieved from a space inaccessible by a hand or fingers of a person. The second step is providing an inanimate magnetically attractable object retrieval apparatus as described above. The third step is threading the object retrieving apparatus through a passage until the head contacts the object and releasably adheres to the object. The fourth step is withdrawing the object retrieving apparatus from the passage with the inanimate magnetically attractable object attached to the head. The fifth step is removing the object from the head.

The invention has many uses. Some include retrieving inanimate objects from spaces inaccessible to fingers and hands. Another is threading electrical cords that are at least partly magnetically attractable through conduits, particularly those with elbows.

The previously mentioned features and advantages will become apparent from the following detailed description of illustrative embodiments thereof, which is to be read in connection with the accompanying drawings.

BRIEF DESCRIPTION OF THE DRAWINGS

The invention will become more fully understood by the accompanying drawings, wherein like elements are represented by like reference characters, that are given by way of illustration only and thus are not limitative of the example embodiments herein.

Figure 1:
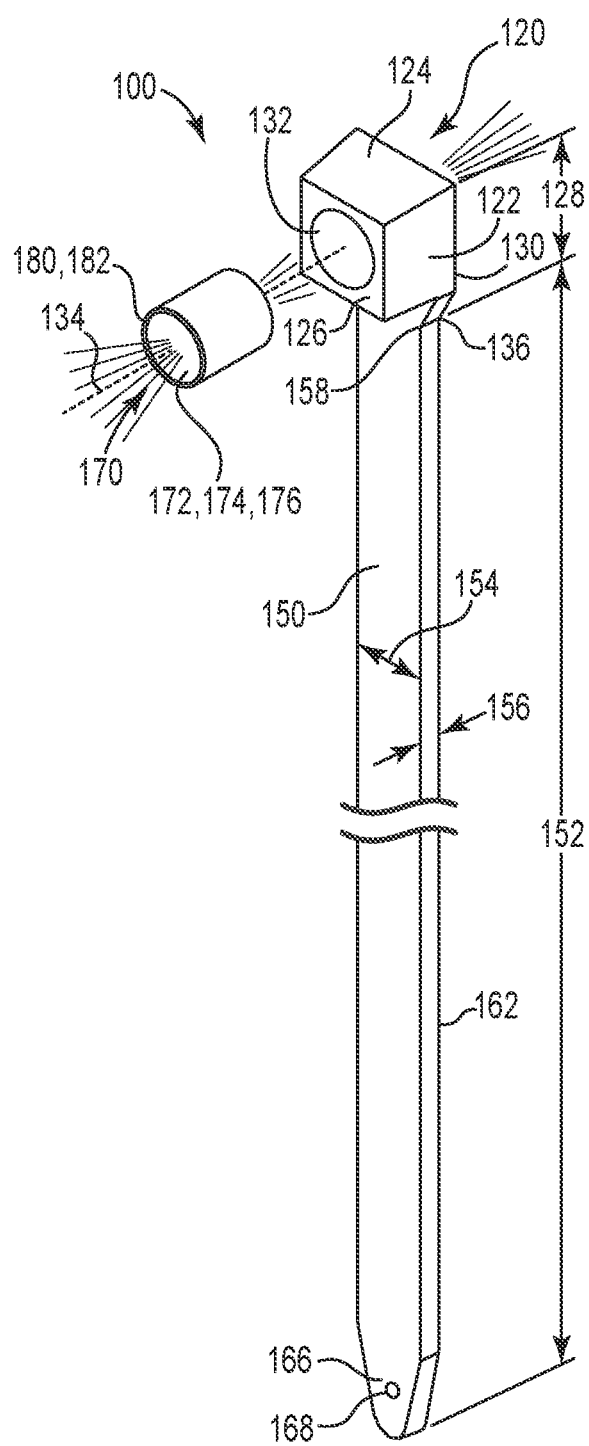
FIG. 1 is a perspective view of an exploded view of an embodiment of the invention with a head having magnetic attraction properties attached to a modified self-locking opening on the side of the end region of a flat flexible body with attractive forces directed perpendicular to a length of the body near where it is attached to the head.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

I have invented a flexible device with an end that is configured to retrieve various sized inanimate magnetically attractable objects from confining spaces with magnetic forces.

The utility of the invention is diverse. Frequently, small, typically inanimate magnetically attractable objects attracted to magnetics such as, for example, items made of magnetically attractable materials or containing magnetically attractable parts, such as for example, nuts, bolts, keys, or glasses with magnetically attractable frames or screws, are mistakenly dropped in confining spaces such as engines, large apparatus being repaired or assembled, and between car seats where it is difficult to retrieve them. Alternatively, sometimes an article such as an electrical cord may need to be threaded through an enclosed. Sometimes these objects are magnetically attractable and sometimes they are not but have magnetically attractable materials attached to such as a magnetically attractable clip, such as, for example, a stainless-steel clip. Sometimes they are in dark recesses and sometimes they are in recesses that have some light to enable one to see the object.

Magnetically attachable materials are materials attracted to magnetic fields. These include, for example iron, cobalt, steel, nickel, manganese, gadolinium, and lodestone and alloys containing these materials such as, ferric stainless steel.

The invention has two aspects, an article aspect and a method of using the article aspect. The article is an inanimate magnetically attractable object retrieval apparatus that comprises two elements: a body and a head.

The body comprises a first end region having a first side, a second side, a first length, a first end, a second end, and a first tail with a first end connected to the second end of the first end region, a second length of at least 3 inches, a first width with a third length, a first thickness with a fourth length that is no more than half of the third length, and a flexibility sufficient to enable the second length of the first tail to be reversibly bent in a 180 degree arc with a diameter of 1 inch only in a plane perpendicular to a plane containing the first width of the first tail and the second length of the first tail and unable to be reversibly bent in a 180 degree arc with a diameter of 1 inch in a plane parallel to the plane containing the first width of the first tail and the second length of the first tail.

The head comprises an affixing element comprising a magnetic material with an affixing surface configured to removably affix with magnetic forces to an inanimate magnetically attractable object with sufficient first force to permit retrieval of the inanimate magnetically attractable object and an attaching element affixed to the affixing element of the head and configured to attach the affixing element of the head to the first end region of the body with a second force that is greater than the first force.

Another embodiment of the attaching element is a strip of self-adhering material releasably affixing the affixing portion of the head to the first end region of the body. Some examples of self-adhering material include, for example, adhesive tape such as, for example, Scotch® Masking Tape, or Scotch® Magic® Tape made by 3M Company, Maplewood, MN, or mechanical fastener strips such Velcro®, or self-clinging thin plastic such as, for example, GLAD® ClingWrap, The Glad Products Company Corporation, Delaware.

In some embodiments, the body comprises a plastic strip with a first end region configured to be permanently attached to the head. One such body is a zip tie also known as a cable tie, hose tie, or by the brand name TY-RAP. It is a type of fastener for holding items together, primarily electrical cables, and wires. Because of their low cost, ease of use, and bundling strength, zip ties are ubiquitous, finding use in a wide range of other applications.

The zip tie, normally made of nylon, has a flexible tape section, also called a tail in this application with teeth that engage with a pawl or leaver in a self-locking opening in the first head region to form a ratchet so that as the free end of the tape section is pulled the cable tie tightens and does not come undone. The pawl is a movable lever that engages a fixed tooth on the tail to either prevent movement in one direction or restrain it altogether. As such, it is a type of latch that typically consists of a spring-loaded lever that engages a series of teeth angled to fasten in only one direction. Some ties include a releasing tab or lever that extends pivotally below the pawl and lowers the pawl from a locking position on a tooth on the bottom of the tail passing into the self-locking opening to release the locking grip of the pawl on the tooth. The pawl may be reached more easily to depress the pawl to release the tooth so that the zip can be loosened, or the tail removed. This allows the zip tie to be reused.

Some zip ties also include a second self-locking opening down on the length of the first end region. Stainless steel versions, some coated with a rugged plastic, cater for exterior applications and hazardous environments. Some end regions contain more than one self-locking opening.

In the invention, the zip tie is not used for bundling objects together but for threading a head containing magnetic material through spaces where hands are difficult to fit to retrieve objects configured to be releasably adhere to the magnetic material in the head while the tail is being withdrawn to open space. Zip ties useful as object retrieval devices are generally those having first tail with a first end connected to the second end of the first end region.

Zip ties used as the body of the inventio may have various lengths, widths and thicknesses depending on the size of the inanimate magnetically attractable object being sought and the place where the object is believed to be located. The length of the tail is at least 3 inches and may be over one or two feet long or more. The width is at least twice the length of the thickness to permit a flexibility sufficient to enable the length of the body to be reversibly bent in a 180-degree arc with a diameter of 1 inch only in the plane perpendicular to the plane of the width and the length but the length and unable to be reversibly bent in a 180 degree arc with a diameter of 1 inch in the plane parallel to the plane of the width and the length. Widths may vary from as little as less than 0.1 inch to as much as over 0.5 inches or more to still be a hand toll. Thicknesses may vary from as little as 0.03 inch to over 0.2 inch. Uses may vary from picking up a tiny screw in a circuit board to a screw or nut in an engine to fishing a wire through a pipe with elbows. The affixing element of the head comprises a magnetic material. The magnetic material in the head may be one of a number of magnetic materials as long as the magnetic force coming from the magnetic material is strong enough to lift the object from its location into open space but not too strong to make removing the object from the magnetic material difficult. In some embodiments, the magnetic material is from a group consisting of the rare earth magnets samarium cobalt and neodymium, alnico, ferrite, and flexible rubber.

The head is attached to the end region by an attaching element. Various means str possible as long as the head is attached to the first end region of the body with more force than the force needed to retrieve the inanimate magnetically attractable object. The attaching element may be, for example, a roughened interface to permit a friction fit of the affixing element to the body. Alternatively, the attaching element may be, for example, adhesive that may be pressure-sensitive, thermoplastic, or thermoset and is used to attach the affixing element to the first end region of the body. One self-locking opening of a zip tie may be drilled out to accommodate a head with magnetic material in the shape of a cylinder of various sizes and magnetic force strengths. The hole may be laterally through the existing self-locking opening or down from the top into the cavity of the self-locking opening to accommodate the cylinder magnet.

Magnets come in various shapes and types of material. Magnetic material of the head may y be in the shape of a cylinder. Magnets in that shape are readily available as, for example, a Neodymium Magnet Round Shaped from MISUMI from Schaumburg, IL 60173 that is either friction fit into the opening, glued into the opening or both. Alternatively, the magnetic material of the head may be in the shape of a disk of various sizes and strengths, such as a Neodymium Disk Magnets from DIYAG, LOVIMA, or MIKEDE sold at Amazon, may be glued to the end of the end region.

In some embodiments, the head attached to the end region of the body is coated with plastic. This may be done by various means. One such means is dipping the head and end region of the body into a pool of liquid plastic, withdrawing the coated region, and allowing the plastic to solidify. Plastics such as thermoplastic materials and thermoset materials may be used. The result is an object retrieval device that is more ease to keep clean and undamaged by use or in storage. Additives such as, for example, pigments or dies, may be added to the plastic to make the retrieval devices easier to see and locate but not adversely interfere with the magnetic forces used to retrieve the inanimate magnetically attractable object. Red pigment is a particularly desirable color to denote cherries and go with a device name of cherry picker retrieval device.

In some embodiments, body is a first zip-tie with the first end region having at least on the first side a first self-locking opening of the first zip tie converted into an opening with an axis and configured to receive the head, so the strongest magnetic attraction forces are parallel the axis of the opening. A cylindrical magnetic head material in a drilled out self-locking opening would be an example is such a construction. The magnet cylinder may be friction fit into the drilled-out hole or adhered into place with glue of some other adhesive such as, for example, a pressure-sensitive, thermoplastic, or thermoset adhesive.

In some embodiments, the body is a first zip tie with the first end of the first end region attached to the head, so the strongest attraction forces are parallel the length of the end region. A disc shaped magnetic material attached to the end of the end region of the body would be an example of such a construction. Alternatively, a hole with an axis may be drilled down into the top of the first end of the end region and a cylindrical magnet may be inserted downward into the hole such that the strongest magnetic field of the magnet is parallel to the hole axis and the length of the end region.

In some embodiments the inanimate magnetically attractable object retrieval apparatus comprises a body that is a first zip tie and the inanimate magnetically attractable object retrieval apparatus further comprises at least one accessory component releasably attachable to the tail near the first end region. The accessory component comprising an accessory element and an accessory attaching element that comprises an accessory attaching structure configured to attach to the tail near the first end region, the accessor.

In some embodiments, the inanimate magnetically attractable object retrieval apparatus comprises a first zip tie with a modified self-locking opening modified to hold a magnetic material containing head as discussed above and a second self-locking opening, a second zip tie with a second tail configured to engage with the second opening of the first zip tie and an accessory attached to the self-locking opening of the second zip tie. Specifically, the body of the inanimate magnetically attractable object retrieval device is a first zip tie with a second self-locking opening on the first side and the inanimate magnetically attractable object retrieval apparatus further comprises a second zip tie and an accessory. The second zip tie has a second tail having a second width similar to the first width, a second length shorter than the first length, and a second thickness similar to the first thickness where the first width and second thickness are configured to releasably attach with the second self-locking opening of the first zip tie. The second zip tie also has a second end region with a second first side that has at least on the second first side a second first self-locking opening converted into a second opening with an axis. The accessory component attached to the second opening, the accessory component comprising an accessory element and an accessory attaching element that comprises an accessory attaching structure and configured to attach to the second opening.

In some embodiments, the previously described inanimate magnetically attractable object retrieval apparatus with an accessory comprises a second self-locking opening that is releasable. This permits the accessory to be removed and replaced by a different accessory or used upon another apparatus.

In some embodiments, the accessory component may be one of several components. For example, accessory components may come from a group consisting of an illumination element, a picture conveying element, and hook. An example of an illumination element suitable for providing illumination to an area where an object is believed to be located is Button Lamp from Panther Vision, West Dundee IL. In some embodiments, the accessory may be attached to the first end region of the body by other releasable means such as a clip that is attached to the accessory by, for example, adhesive such as pressure-sensitive, thermoplastic, or thermoset adhesive.

In some embodiments, the hook may be incorporated into the plastic that surrounds the head and end region of the inanimate magnetically attractable object retrieval device. The hook may be useful for augmenting the retrieval activity. Alternatively, the hook may be useful for displaying the device in a sale situation.

In some embodiments, the head further comprises a hook affixed to the head with a third force greater than the first force used to retrieve the object and configured to releasably attach the object to enable the object to be retrieved. Hooks may be attached by a variety of means, such as, for example, rubber bands, pressure-sensitive tape, or clips.

In some embodiments, the tail may further comprise a hole in which a hooking element may be inserted. An example of such a hook can be as simple as a paper clip bent open to provide a hook on either end. One end may be used to insert into the tail hole. The other end may be used to hang about a house or a work room for easy retrieval when needed.

In some embodiments, the body comprises a plastic strip with jagged edges known as a drain cleaner. The end region of the body is the tip that is in communication with the head or adhering element. The adhering element is a magnet adhered to the tip and configured to retrieve magnetically attachable objects from water lines such as toilet lines, sink drains, or tub and shower drains. The attaching element is configured to not lose its function of adhering the magnet to the end region with exposure to water. The body is configured with a tail to catch onto and dislodge debris in above mentioned water line and drain when pushed into the water line and pulled from the water line. The end region of the body is a tip that is at a first end of the body opposite a handle. The first end has a first side and a second side. The affixing head is a magnet in communication with the tip and the attaching element is configured to adhere the magnet to the tip. The attaching element may comprise a hole through the first side and second side of the tip configured to adhere to a magnet with friction, adhesive, or both. Alternatively, the attaching element may comprise, for example, an adhesive or an adhering tape construction such as a mechanical fastener or tape or an adhesive tape, or a cling wrap film or plastic coating as discussed above. Preferably the attaching element is resistant to losing its adherence by exposure to water because of the application of the drain cleaner with water lines. The magnet adhering element is suitable for retrieving magnetically attractable objects from drains.

In some embodiments, the inanimate magnetically attractable object retrieval apparatus further comprising a rigid member releasably affixed to at least a portion of the body. This may allow the head of the retrieval apparatus to be guided past magnetically attractive material along the way to reaching the inanimate magnetically attractable object being retrieved. Examples of magnetically attractable materials include iron, iron-containing alloys such as ferric stainless steel, cobalt, steel, nickel, manganese, gadolinium, and lodestone. Imparting resistance to these adversely attracting magnetic materials causing the head to bend toward them and not reach its intended target may be done, for example, by simply attaching a non-magnetic rod such as, for example, a wooden dowel or copper rod with adhesive tape to a portion of the first tail of the first zip to provide rigidity to a portion of the tail. This would provide stiffness to the body and allow the head to be forced past magnetically attractable material until it reaches the desired magnetically attractable object to be retrieved.

The rigid member may also be a non-magnetic tube configured to encompass at least a portion of the body. The tube has a thickness sufficient to provide sufficient rigidity to the body to permit the head to be forced past adversely magnetically attractable material before it reaches the magnetically attractable object being retrieved.

In some embodiments, the thickness may be enough to also reduce the magnetic attraction between magnetically attractable material and the magnet in the head when the tube is able to fit over the head.

The tube has an inside diameter at least larger than the width of the body. The inner diameter of at least a portion of the tube is configured to fit around the head of the magnetically attractable object retrieval apparatus to decrease magnetic attraction of the head to adverse magnetically attractable material. The tube is then withdrawn from covering the head to allow the head to magnetically attach more aggressively to the inanimate magnetically attachable object that is desired to be retrieved.

The length of the tube may be any length up to just shoe tot the length of the body of the inanimate magnetically attractable object retrieval apparatus. The body may be straight, may have a section that is curved or bent in a permanent manner, or may have a section that is curved in a reversable manner, such as, for example, a straw with an accordion section configured to have a bottom section vertically straight in a cup while a top section is able to bend at an angle into a mouth. Angular sections would also provide regions that are easier to grasp during use or to fit around passageway bends.

In addition, this embodiment permits a "catch and release" action where the object being retrieved is magnetically caught and removed from the magnetically attractable object retrieval apparatus as the head is pulled into the tube. The retrieved object may be pulled off the head when the object is larger than the inner diameter of the tube. Also, the retrieved object may be scraped off the head when the object is magnetically attached to a head with a magnetic field that is perpendicular to the length of the first end region. In some embodiments, the tube end may have a larger diameter to accommodate only the head. In some embodiments, the tube may have an endcap that contacts a head with stronger magnetic forces projecting parallel with the length of the body length and allows those magnetic fields to easily penetrate the cap. In this embodiment, the magnetically retrieved magnetically attractable object is released from the head when the retrieval apparatus is pulled up the tube from the cap.

Tubes are made of non-magnetic materials. These include, for example, plastic, paper, rubber, ceramic, non-magnetic metals such as, for example, tin, copper, nonmagnetic stainless steel and aluminum, and plastic tubes coated with such metals in the inside or outside or both. Magnetic forces may be reduced when non-magnetic materials are used with sufficient thicknesses in some cases.

The inventio may be better understood through fourteen figures.

FIG. 1 is a perspective view of an exploded view of an embodiment of the invention with a head having magnetic attraction properties attached to a modified self-locking opening on the side of the end region of a flat flexible body with attractive forces directed perpendicular to a length of the body near where it is attached to the head. The body (120) of the inanimate magnetically attractable object retrieval apparatus (100) is shown as a modified zip tie with a first end region (122) with a first end region first end (124), a first end region first side (126), a first end region length (128), and a first end region second side (130). First end region 122 also contains a locking opening (146) not shown because the opening has been modified by being drilled out to be a hollow cylindrical hole (132) with an axis (134) where the hole passes through the first end region 122 from first end region first side 126 to first end region second side 130. First end region also has a first end region second end (136) attached to a flexible tail (150) at a tail first end (158). Also shown is a tail length (152), a tail width (154), a tail thickness (156), a tail second side (160), a multitude of tail second side locking teeth (162) that are unused in this embodiment, a tail second end (166), and an optional tail second end hole (168) that may be used to attach a hook to hang apparatus 100 on a wall. A head (170) consisting of a cylindrical affixing element (172) with an affixing surface (174) of an affixing material (176), in this case a magnet exerting strongest magnetic force along hole axis 134 perpendicular to end region length 128, has an attaching element (180) formed by an attaching structure (182), in this case an adhesive layer, to attach head 170 to body 120.

Figure 2:
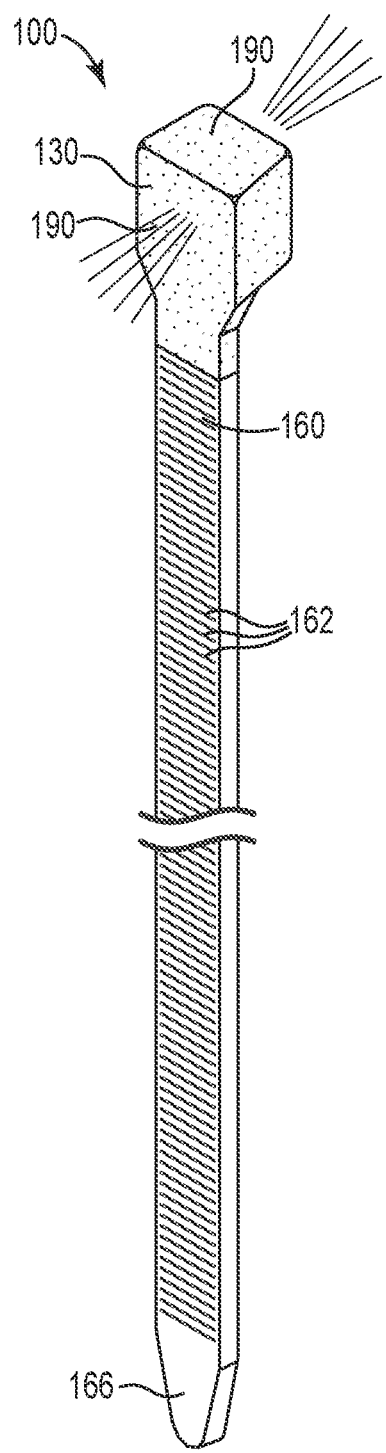
FIG. 2 is a perspective view of a collapsed view of the embodiment of the invention shown in FIG. 1 rotated 180 degrees about the tail length and with a plastic cover over the head and body end region.

FIG. 2 is a perspective view of a collapsed view of the embodiment of the invention shown in FIG. 1. Inanimate magnetically attractable object retrieval apparatus 100 is rotated 180 degrees about tail length 152 and with a plastic cover (190) is placed over head 170 and body end region 122.

Figure 3:
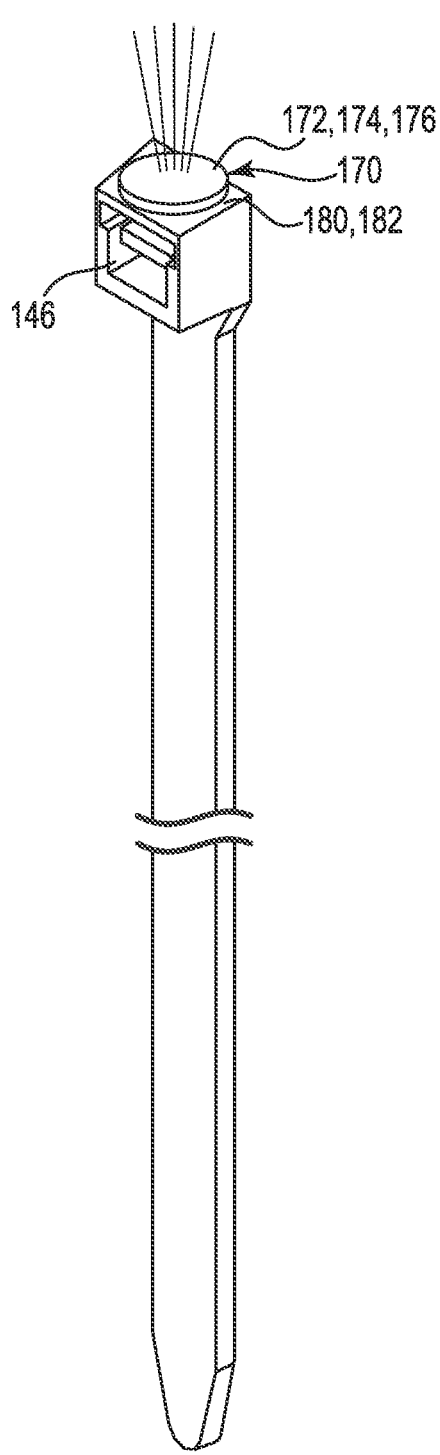
FIG. 3 is a perspective view of an embodiment of the invention with a head having magnetic attraction properties attached to the first end of the end region of a flat flexible body with attractive forces directed parallel to a length of the body near where it is attached to the head.

FIG. 3 is a perspective view of an exploded view of an embodiment of the invention with a head having magnetic attraction properties attached to the first end of the end region of a flat flexible body with attractive forces directed parallel to a length of the body near where it is attached to the head. The embodiment is similar to that shown in FIG. 1 except locking opening 146 is not drilled out but is unused and affixing element 172 is placed differently with a different shape. Head 170 consisting of a disc-shaped affixing element (172) with an affixing surface (174) of an affixing material (176), in this case a magnet exerting strongest magnetic force outward from the disc surface and parallel to end region length 128, has an attaching element (180) formed by an attaching structure (182), in this case an adhesive layer, to attach head 170 to body 120 at end region first end 124.

Figure 4:
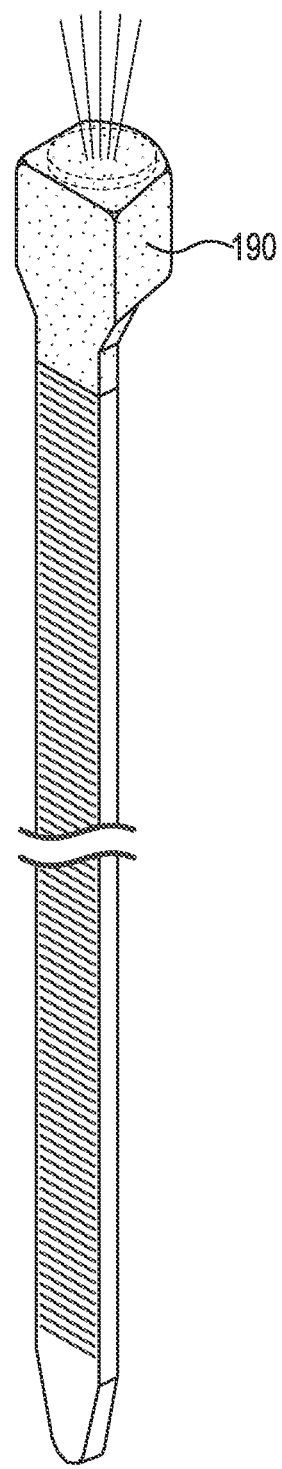
FIG. 4 is a perspective view of the embodiment of the invention shown in FIG. 3 rotated 180 degrees about the tail length and with a plastic cover over the head and body end region.

FIG. 4 is a perspective view of a collapsed view of the embodiment of the invention shown in FIG. 3 rotated 180 degrees about the tail length and with plastic cover 190 over the head and body end region.

Figure 5:
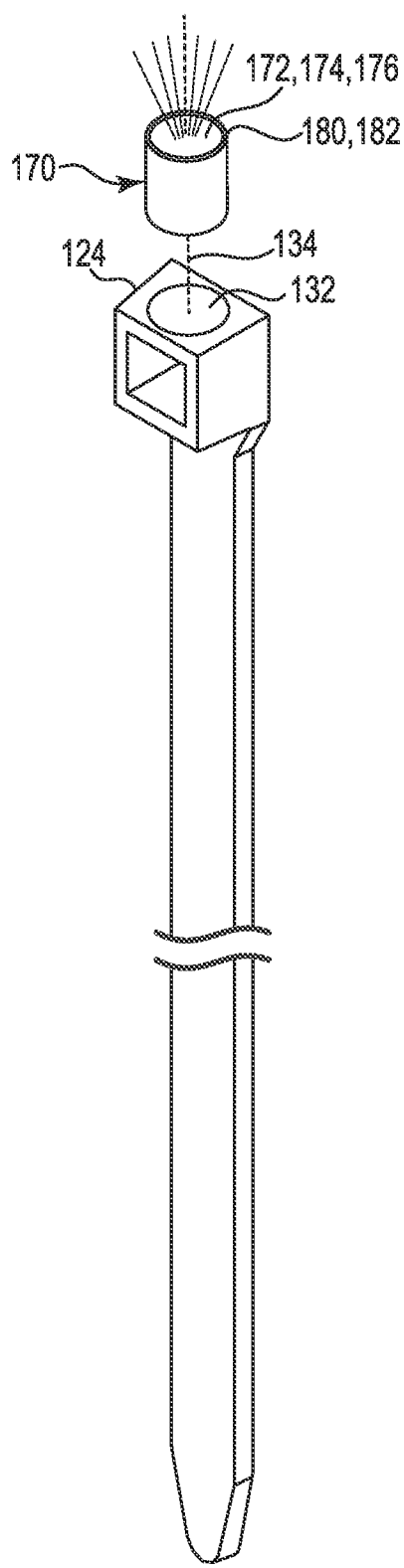
FIG. 5 is a perspective view of an embodiment of the invention with a head having magnetic attraction properties attached to the first end of the end region of a flat flexible body with attractive forces directed parallel to a length of the body near where it is attached to the head.

FIG. 5 is a perspective view of an exploded view of an embodiment of the invention with a head having magnetic attraction properties attached to the first end of the end region of a flat flexible body with attractive forces directed parallel to a length of the body near where it is attached to the head. The embodiment is similar to that shown in FIG. 1 except the locking opening 146 is drilled out into hole 132 but from first end region first end 124 not first end first side 128 and the hole axis 134 is parallel to end region length 128. Head 170 consisting of the same cylinder-shaped affixing element 172, affixing surface 174, and affixing material 176 with the same attaching element 180 with affixing structure 182.

Figure 6:
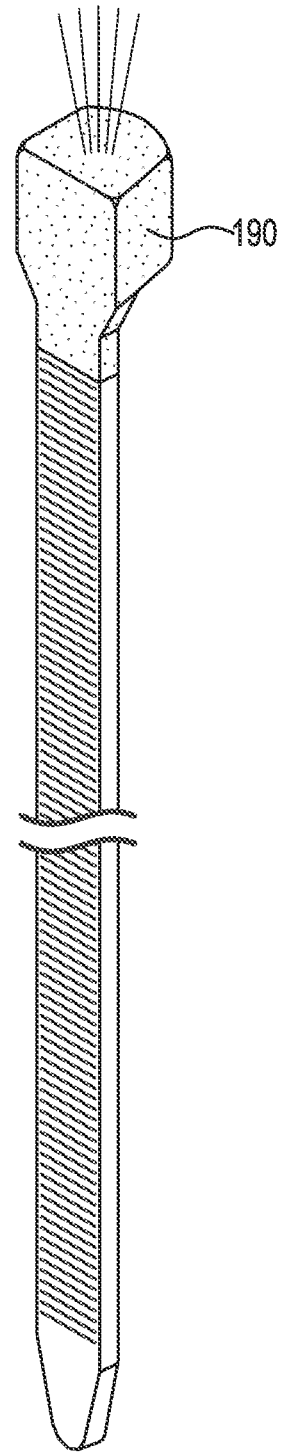
FIG. 6 is a perspective view of the embodiment of the invention shown in FIG. 5 rotated 180 degrees about the tail length and with a plastic cover over the head and body end region.

FIG. 6 is a perspective view of a collapsed view of the embodiment of the invention shown in FIG. 5 rotated 180 degrees about the tail length and with plastic cover 190 over the head and body end region.

Figure 7:
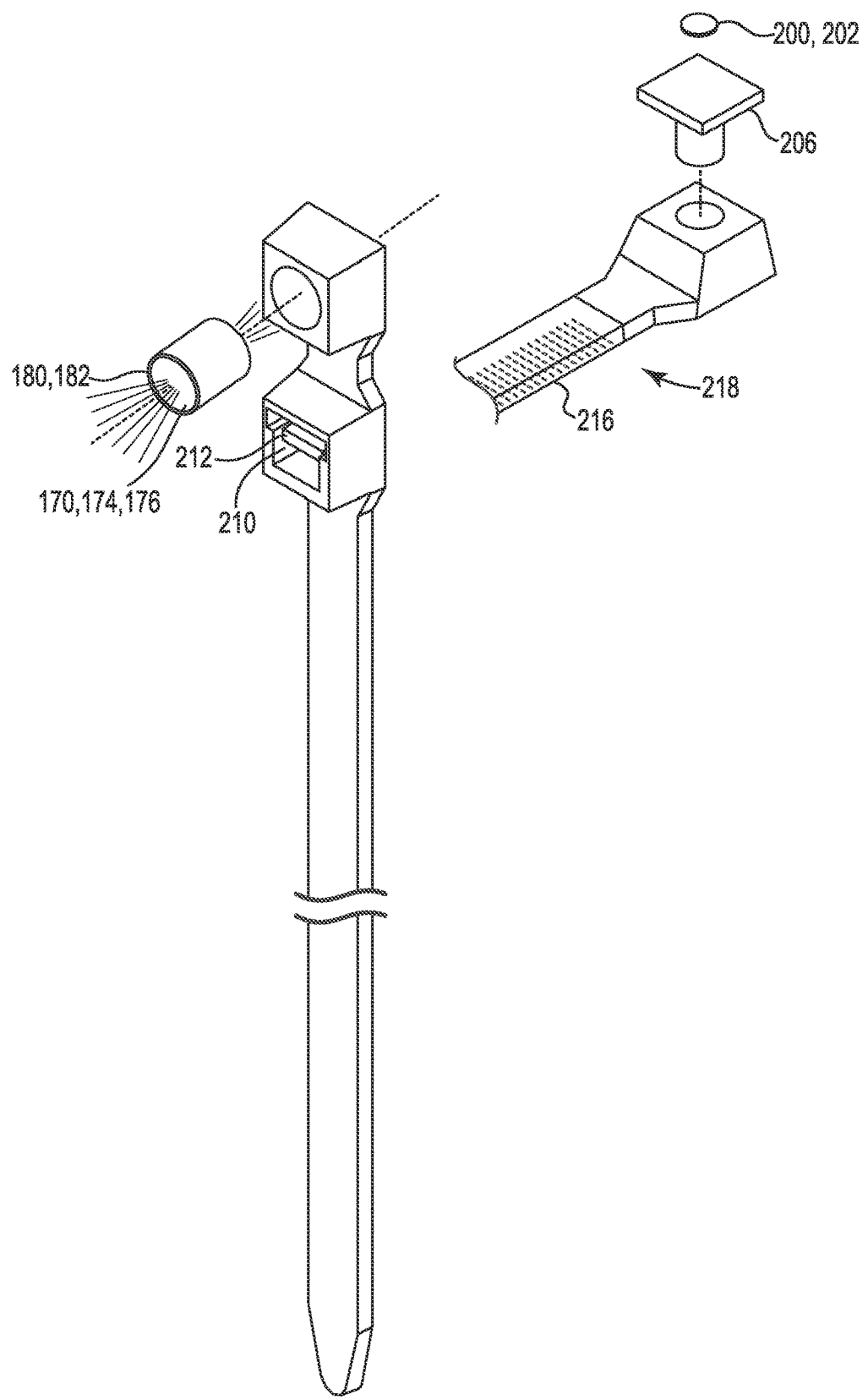
FIG. 7 is a perspective view of an exploded view of an embodiment of the invention with a head having magnetic attraction properties attached to a modified self-locking opening on the side of the end region of a flat flexible body with attractive forces directed perpendicular to a length of the body near where it is attached to the head, a second self-locking opening after the first and a source of light with battery pack attached to a second modified self-locking opening of the body with a second zip tie.

FIG. 7 is a perspective view of an exploded view of an embodiment of the invention with a head having magnetic attraction properties attached to a modified locking opening on the side of the end region of a flat flexible body with attractive forces directed perpendicular to a length of the body near where it is attached to the head, a second locking opening after the first and a source of light (202) with battery attached to a second modified locking opening of the body with a second zip tie. The embodiment is similar to that shown in FIG. 1 except below the first modified locking opening is a second locking opening (210) with a locking lever or pawl (212) to engage a multitude of locking teeth (216) on a second zip tie (218). An accessory (200), in this case a source of light (202), is shown on a platform with a post attached to second zip tie 218.

Figure 8:
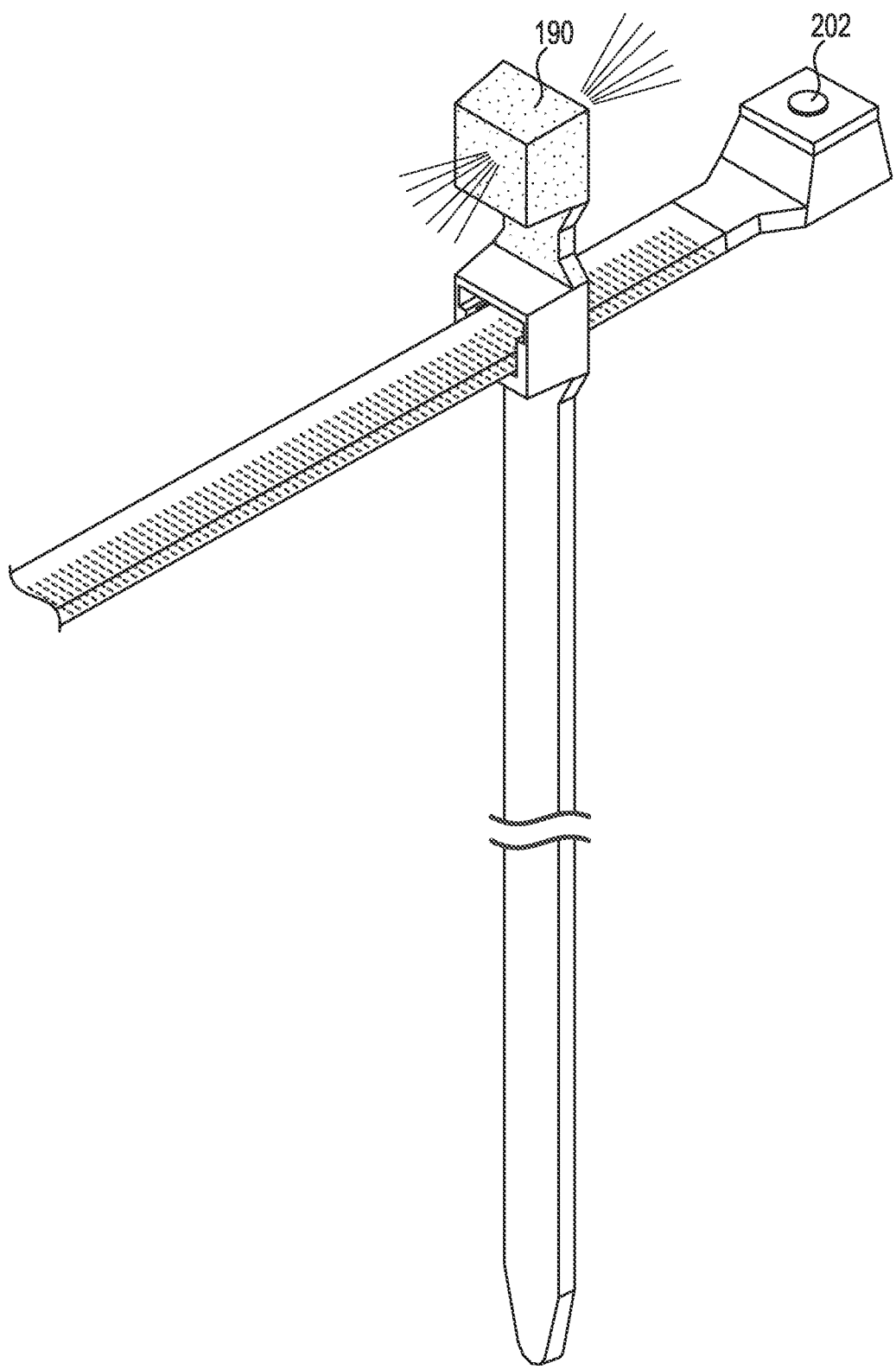
FIG. 8 is a perspective view of a collapsed view of the embodiment of the invention shown in FIG. 7 rotated 180 degrees about the tail length and viewed from below horizontal with a plastic cover over the head and upper body end region but not the second locking opening.

FIG. 8 is a perspective view of a collapsed view of the embodiment of the invention shown in FIG. 7 rotated 180 degrees about the tail length and with a plastic cover placed over the head and upper body end region but not the second locking opening.

Figure 9:
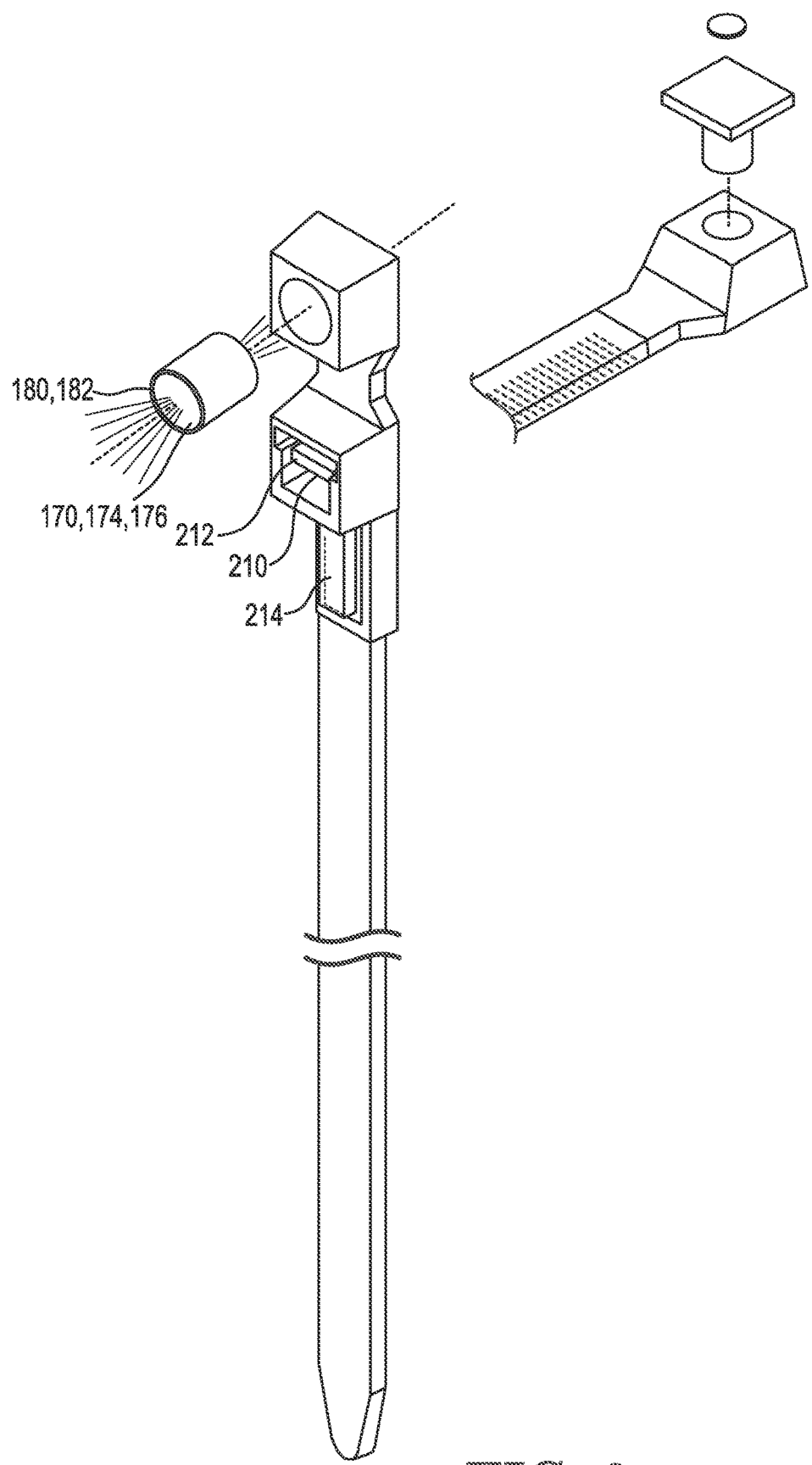
FIG. 9 is a perspective view of an exploded view of an embodiment of the invention with a head having magnetic attraction properties attached to a modified self-locking opening on the side of the end region of a flat flexible body with attractive forces directed perpendicular to a length of the body near where it is attached to the head, a second releasable self-locking opening before the first and a source of light is attached to the second releasable self-locking opening of the body with a second zip tie.

FIG. 9 is a perspective view of an exploded view of an embodiment of the invention with a head having magnetic attraction properties attached to a modified self-locking opening on the side of the end region of a flat flexible body with attractive forces directed perpendicular to a length of the body near where it is attached to the head, a second releasable self-locking opening before the first and a source of light is attached to the second releasable self-locking opening of the body with a second zip tie. The embodiment is similar to that shown in FIG. 5 except second releasable self-locking opening 210 with locking lever or pawl 212 also contains a locking release lever (214) to releasably engage multitude of locking teeth 216 on second zip tie (218).

Figure 10:
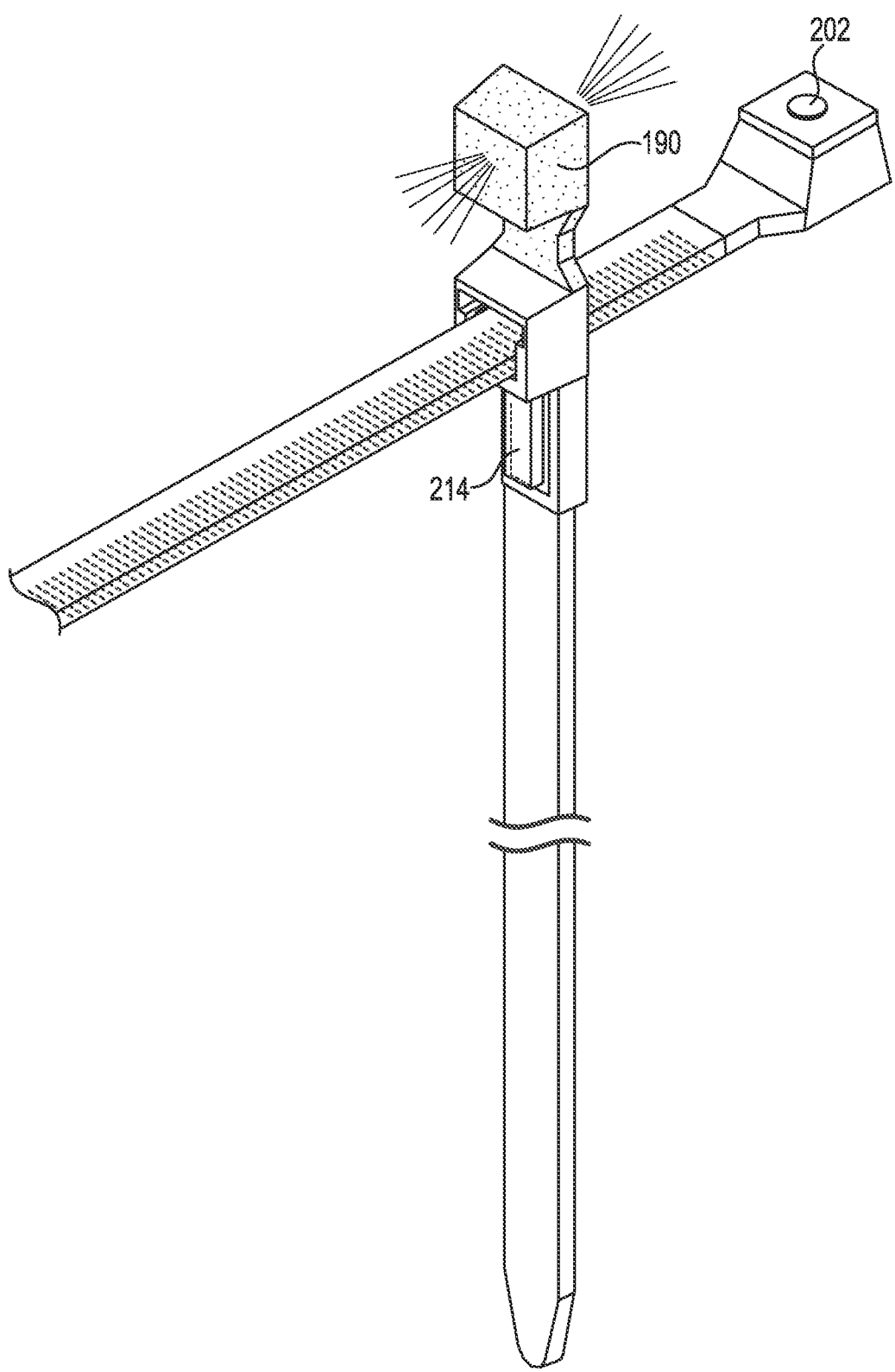
FIG. 10 is a perspective view of a collapsed view of the embodiment of the invention shown in FIG. 9 rotated 180 degrees about the tail length and with a plastic cover over the head and upper body end region except for the second releasable self-locking opening.

FIG. 10 is a perspective view of a collapsed view of the embodiment of the invention shown in FIG. 9 rotated 180 degrees about the tail length and with a plastic cover over the head and upper body end region but not the second releasable self-locking opening.

Figures 11, 12:
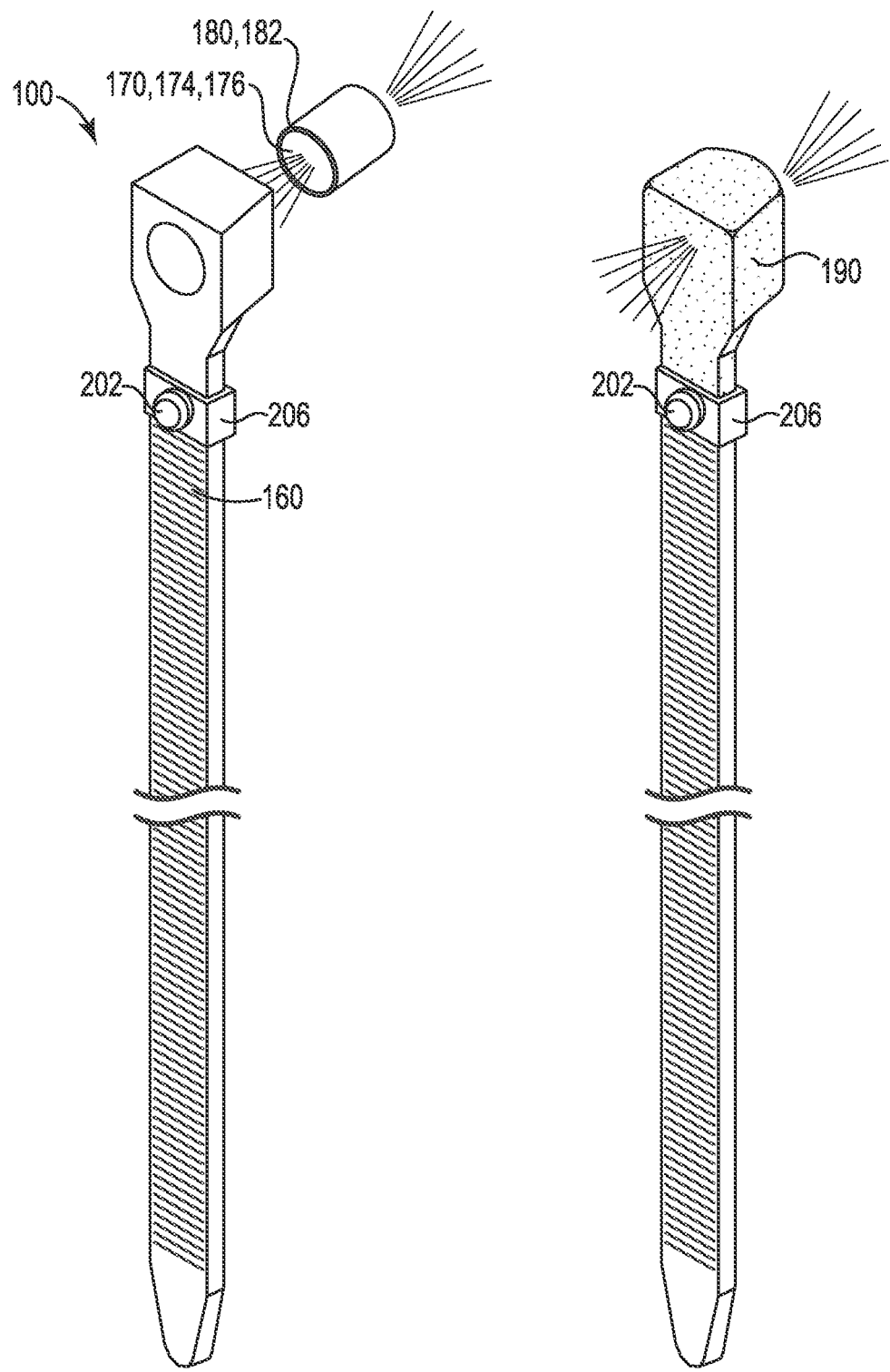
FIG. 11 is a perspective view of an exploded view of an embodiment of the invention with a head having magnetic attraction properties attached to a modified locking opening on the side of the end region of a flat flexible body with attractive forces directed perpendicular to a length of the body near where it is attached to the head and a source of light is releasably attached to the body with a clip just below the locking openings.
FIG. 12 is a perspective view of a collapsed view of the embodiment of the invention shown in FIG. 11 and with a plastic cover over the head and upper body end region.

FIG. 11 is a perspective view of an exploded view of the embodiment shown in FIG. 1. with attractive forces directed perpendicular to a length of the body near where it is attached to the head but with a source of light that is releasably attached to the body with a clip just below the locking openings. The embodiment is similar to that shown in FIG. 1 except below the first locking opening is an accessory attaching element (206), in this case a clip. Accessory 200, in this case source of light 202, is shown attached to clip 206.

FIG. 12 is a perspective view of a collapsed view of the embodiment of the invention shown in FIG. 11 and with a plastic cover over the head and upper body end region.

Figure 13:
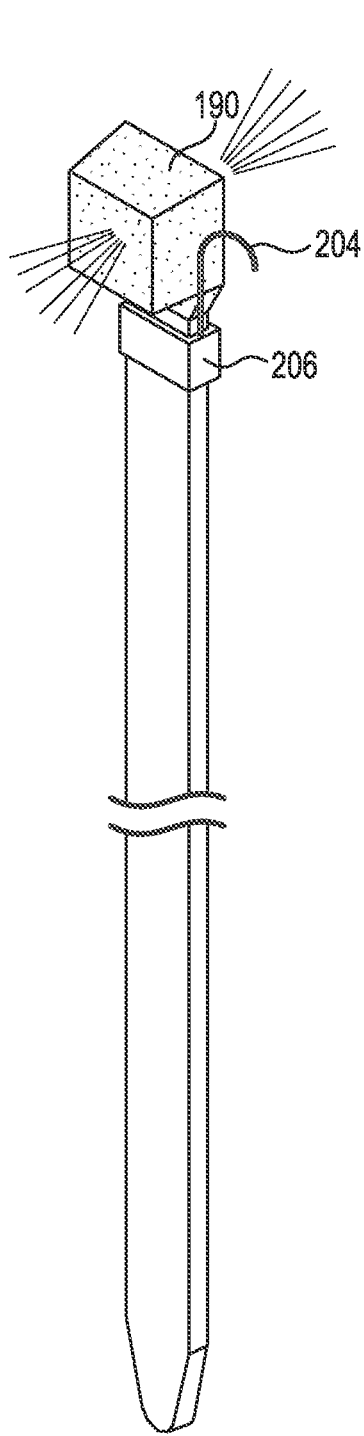
FIG. 13 is a perspective view of the embodiment of the invention shown in FIG. 2 with a hook releasably attached to the head with a clip.

FIG. 13 is a perspective view of the embodiment of the invention shown in FIG. 2 with a hook (204) releasably attached to the head with a clip.

Figure 14:
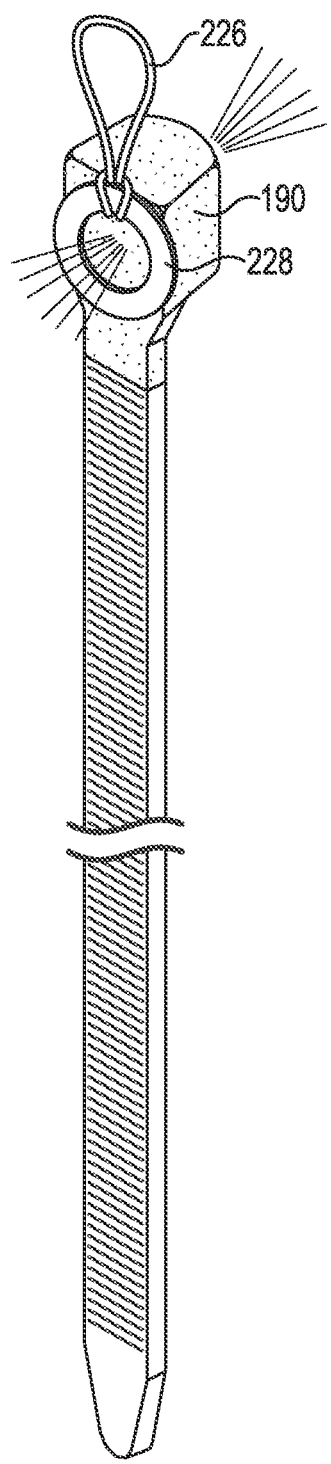
FIG. 14 is a perspective view of the embodiment of the invention shown in FIG. 4 with a loop releasably attached to the head with a magnetically attractable washer.

FIG. 14 is a perspective view of the embodiment of the invention shown in FIG. 4 with another accessory, a loop (226), releasably attached to the head with an accessory attaching structure, a magnetically attractable washer (228).

Figure 15:
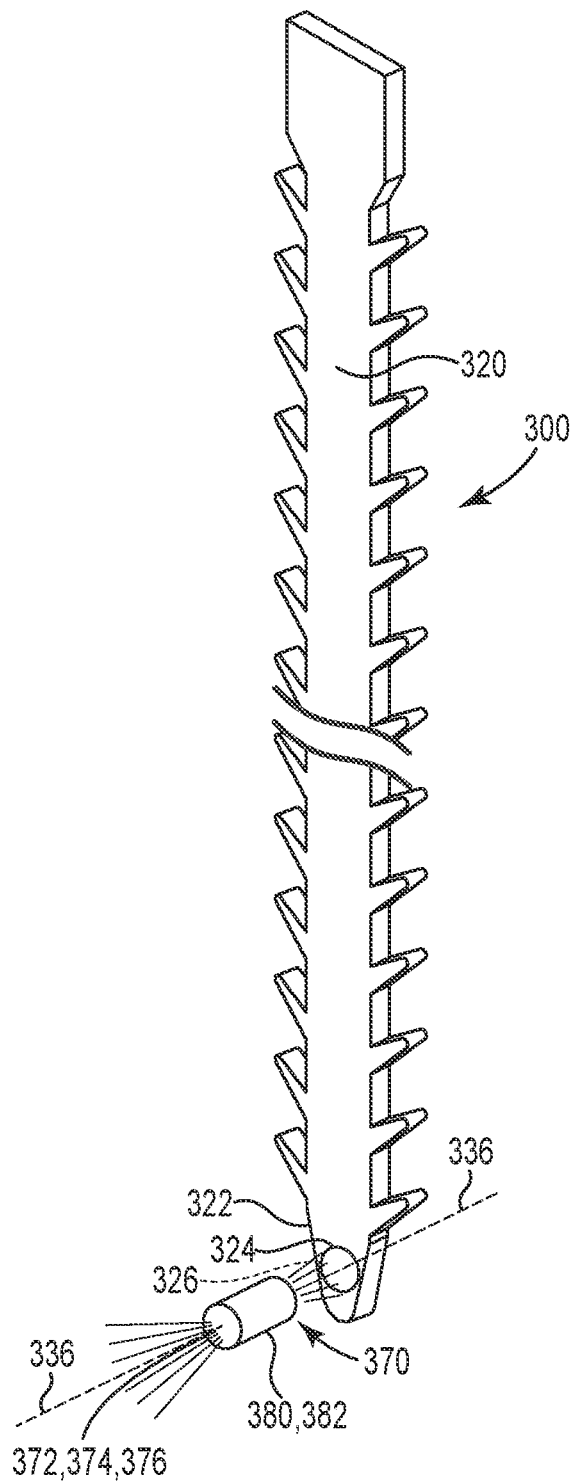
FIG. 15 is a perspective of an exploded view of an embodiment of the invention with a head having magnetic attraction properties attached to a hole in the end region of a flat flexible body, this time the tip, with attractive forces directed perpendicular to a length of the body near where it is attached to the head.

FIG. 15 is a perspective of an exploded view of an embodiment of the invention with a head having magnetic attraction properties attached to a hole of the end region, this time the tip, of a flat flexible body. The body (320) of the inanimate magnetically attractable object retrieval apparatus (300) is shown as a drain stick with a modified first end region (322), a tip, with a hole (324) with an axis (326). A head (370) consisting of a cylindrical magnet affixing element (372) with an affixing surface (374) of an affixing material (376), in this case a magnet exerting strongest magnetic force along hole axis 0361 perpendicular to end region length 322, has an attaching element (380) formed by an attaching structure (382), in this case an adhesive layer, to attach head 370 to body 320.

Figure 16:
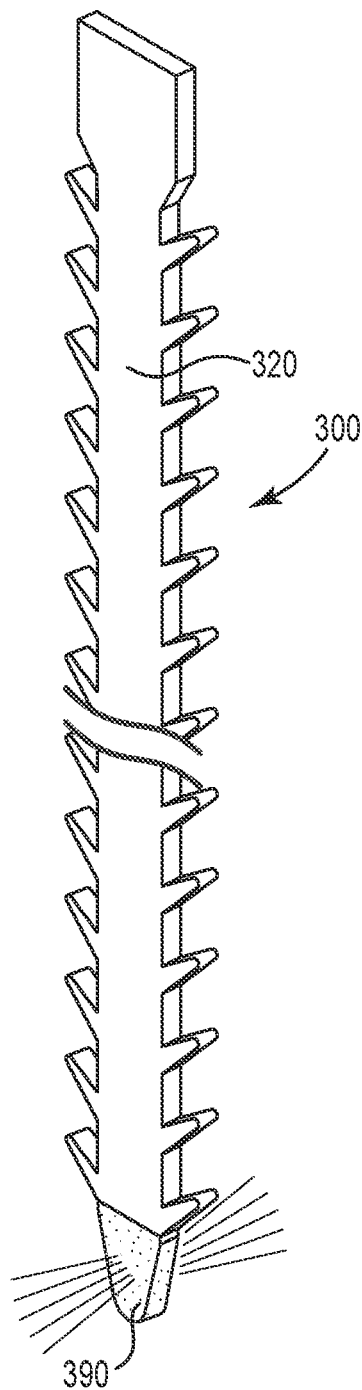
FIG. 16 is a perspective view of a collapsed view of the embodiment of the invention shown in FIG. 15.

FIG. 16 is a perspective view of a collapsed view of the embodiment of the invention shown in FIG. 15. Inanimate magnetically attractable object retrieval apparatus 300 is shown with a plastic cover (390) placed over head 370 and body end region 322 at the tip of the drain stick.

Figure 17:
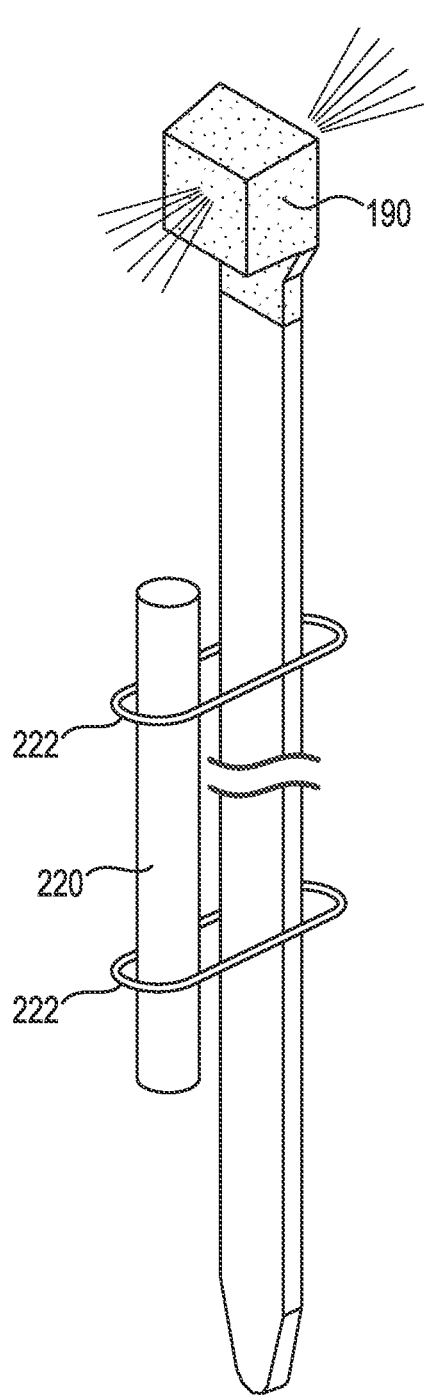
FIG. 17 is a perspective view of an embodiment of the invention similar to that shown in FIG. 2 with a rigid element and restrains shown as exploded.

FIG. 17 is a perspective view of an embodiment of the invention similar to that shown in FIG. 2 with a rigid element and a restraint shown as exploded. A rigid support element (220), in this case a wooded rod, is fastened to the tail with removable fasteners (222), in this case elastic rubber bands, to provide rigidity of the tail as it is passed through passageways containing magnetically attractable material to avoid prematurely attracting the head before it contacts the inanimate magnetically attractable object being retrieved.

Figure 18:
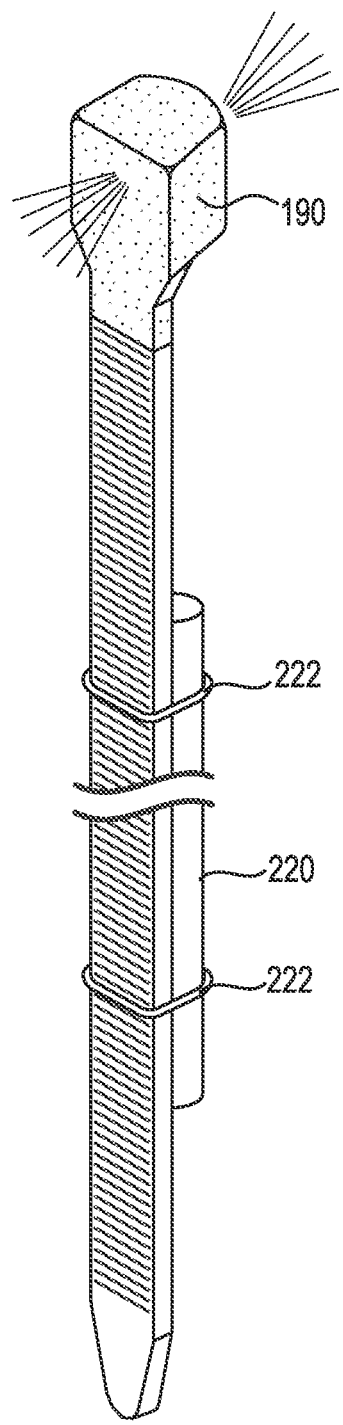
FIG. 18 is a perspective view of a collapsed view of the embodiment of the invention shown in FIG. 15 rotated 180 degrees about the tail length and the support restraints shown as collapsed.

FIG. 18 is a perspective view of a collapsed view of the embodiment of the invention shown in FIG. 17 rotated 180 degrees about the tail length and the support restraints shown as collapsed.

Figure 19:
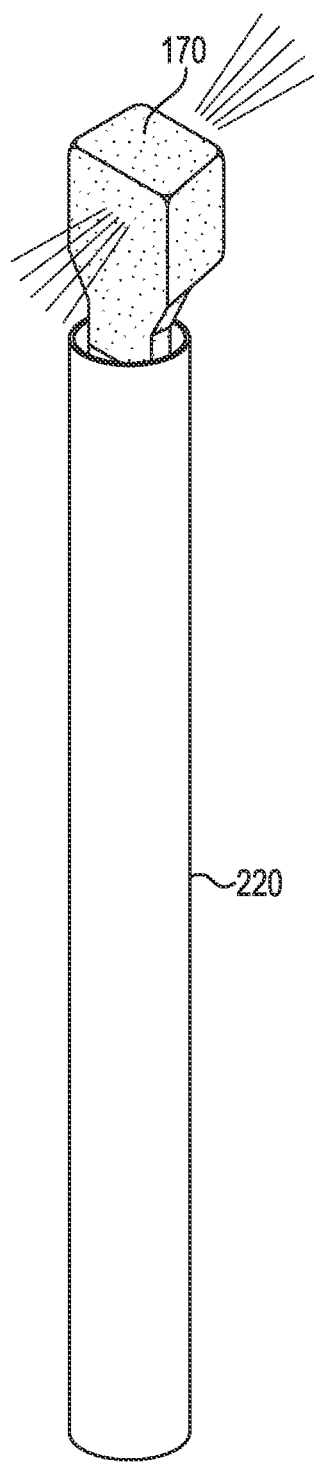
FIG. 19 is a perspective view of an embodiment of the invention similar to that shown in FIG. 2 with a rigid element shown as engaged up to the head.

FIG. 19 is a perspective view of an embodiment of the invention similar to that shown in FIG. 2 with a rigid element shown as engaged over a portion of the tail and up to the head. A rigid support element (220), in this case a plastic tube, is releasably encompassing a portion of the tail to provide rigidity of the tail as it is passed through passageways containing magnetically attractable material to avoid premature attraction of the head to the magnetically attractable material before the head contacts the inanimate magnetically attractable object being retrieved.

Figure 20:
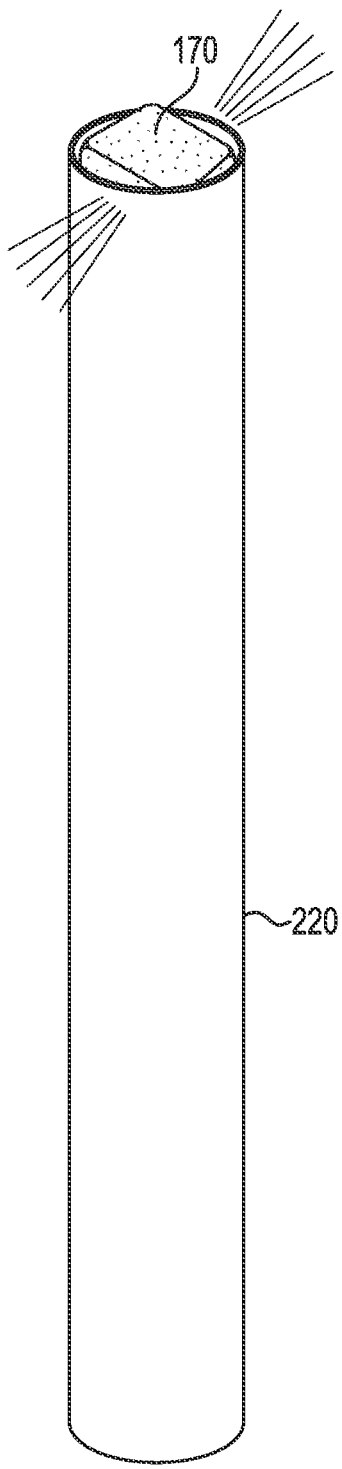
FIG. 20 is a perspective view of an embodiment of the invention similar to that shown in FIG. 2 with a rigid element shown as engaged up to and over the head.

FIG. 20 is a perspective view of an embodiment of the invention similar to that shown in FIG. 2 with a rigid element shown as engaged over a portion of the tail and up to and over the side of the head. A rigid support element (220), in this case a plastic tube, is releasably encompasses a portion of the tail to provide rigidity of the tail as it is passed through passageways containing magnetically attractable material to avoid premature attraction of the head to the magnetically attractable material before the head contacts the inanimate magnetically attractable object being retrieved. Removal of the retrieval apparatus from the tube results in the magnetically attractable retrieved object from being released from the apparatus by scraping of the tube edge on the magnet surface of head 170.

Figure 21:
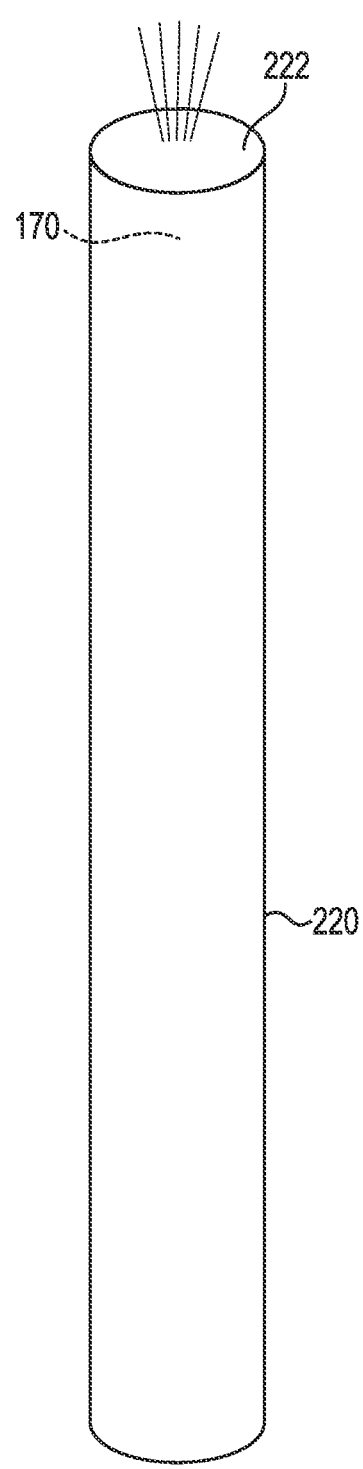
FIG. 21 is a perspective view of an embodiment of the invention similar to that shown in FIG. 5 with a rigid element is shown as engaged over the head.

FIG. 21 is a perspective view of an embodiment of the invention similar to that shown in FIG. 6 with a rigid element is shown as engaged over a portion of the tail and over the top of the head. A rigid support element (220), in this case a plastic tube, is releasably encompasses a portion of the tail, to provide rigidity of the tail as it is passed through passageways containing magnetically attractable material to avoid prematurely attracting the head before it contacts the inanimate magnetically attractable object being retrieved. The tube cap (220) covers the head with the strongest magnetic field parallel to the end region. Removal of the retrieval apparatus from the tube results in the magnetically attractable retrieved objects being released from the apparatus by cap 220 keeping the object (not shown) still as retrieval apparatus 100 with its head 170 is withdrawn from tube 220.

The method of using an object retrieval apparatus that comprises five steps in its main embodiment.

The first step is providing an inanimate magnetically attractable object to be retrieved from a space inaccessible by a hand or fingers of a person.

The second step is providing an inanimate magnetically attractable object retrieval apparatus as described above.

The third step is threading the inanimate magnetically attractable object retrieval apparatus through a passage until the head contacts the inanimate magnetically attractable object and releasably adheres to the inanimate magnetically attractable object.

The fourth step is withdrawing the object retrieving apparatus from the passage with the object attached to the head.

The fifth step is removing the inanimate magnetically attractable object from the inanimate magnetically attractable object retrieval apparatus.

In some embodiments, the method of using an inanimate magnetically attractable object retrieval apparatus has a body that is a first zip tie with a second self-locking opening on the first side and the inanimate magnetically attractable object retrieval apparatus further comprises a second zip tie and an accessory component and the method further comprises two more steps.

The second zip tie with a second tail has a second width similar to the first width, a fifth length shorter than the first length, and a second thickness similar to the first thickness is configured to attach with the second self-locking opening of the first zip tie, and a second end region with a second first side that has at least on the second first side a second first self-locking opening converted into a second opening with an axis.

The accessory component attachable to the second opening comprises an accessory element and an accessory attaching element that comprises an accessory attaching structure, in this case comprising the second zip tie configured to attach to the second opening with an axis and configured to attach to the second opening with an overlapping axis.

The method further comprises the steps of (1) attaching the accessory component to the second self-locking opening and (2) using the accessory component to assist retrieving the inanimate magnetically attractable object.

In some embodiments, the method of using an inanimate magnetically attractable object retrieval apparatus as just discussed with an accessory except the second self-locking opening is releasable and the accessory component is releasably attachable. In addition, the method further comprises the two steps of (1) removing the accessory component from the apparatus and (2) reattaching the accessory to an inanimate magnetically attractable object retrieval apparatus to retrieve an inanimate magnetically attractable object more easily.

In some embodiments, the method of using an inanimate magnetically attractable object retrieval apparatus containing releasably attachable accessories do not contain second zip ties and second self-locking openings but use attaching mechanisms such as, for example, attaching elements such as clips affixed to an accessory component and configured to releasably attach to the tail of the first zip tie near the first region affixed to the head.

In some embodiments, the method of using an inanimate magnetically attractable object retrieval apparatus with an accessory comprise an accessory component that is a source of illumination. This provides illumination in a location where the inanimate magnetically attractable object is thought to be located before releasably adhering the head to the inanimate magnetically attractable object.

In some embodiments, the method of using an inanimate magnetically attractable object retrieval apparatus is used to pull something through a passageway such as a wire through a conduit with a bend. In this embodiment, the inanimate magnetically attractable object is the magnetically attractable first end of a wire. The wire end may be inherently magnetically attractable or may comprise a magnetically attractable material such as a steel washer that is attached with various methods such as, for example, a clip, to the first end of the wire to make it magnetically attractable. The passage is in a conduit with a first end, a second end, and a bend. The method further comprises three steps. The first step is threading the first end of the wire into the first end of the conduit before the bend. The second step is threading the head into the second end of the conduit past the bend until the head is releasably adhered to the first end of the wire. The third step is pulling the inanimate magnetically attractable object retrieval apparatus releasably adhered to the first end of the wire through the second end of the conduit. The inanimate magnetically attractable object retrieval apparatus is effective in negotiating elbows in conduit piping and eases the threading process. The inanimate magnetically attractable object retrieval apparatus may also be used to thread a wire even when there is no bend.

In some embodiments, further comprising the step of releasably attaching a rigid member to at least a portion of the tail. This provides rigidity of the body as the inanimate magnetically attractable object retrieval apparatus passes areas of the passage that adversely may be magnetically attracted to the head before the head reaches the inanimate magnetically attractable object being retrieved. As discussed above, the rigid member permits the head to be pushed past the adversely attracting area or areas. The rigid member may be a rod or a tube. It may be straight or have one or more curves in it. The tube may be simply rigid or may also be configured to decrease magnetic fields as discussed above.

The tube may comprise nonmagnetic field attracting material over an end that may be withdrawn from the head when the head has retrieved the inanimate magnetically attractable object. This forms a catch and release sequence where the inanimate magnetically attractable object to be retrieved is caught by the head of the inanimate magnetically attractable object retrieving apparatus and released without touching the inanimate magnetically attractable object when the head is pulled from the tube with cap. Similarly with a tube touching and covering the head with magnets perpendicular to the body, the object retrieved is released when the head is pulled quickly from the tube. In the case there the tube does not cover the head but can fit over the head, the retrieved object may be scraped off the head when the head is pulled through the tube.

There are many situations where a flexible inanimate magnetically attractable object retrieval apparatus would be useful beyond those discussed here.

What is claimed is:

1. An inanimate magnetically attractable object retrieval apparatus comprising,
a body comprising a plastic strip from a group consisting of a fastener for holding items together or a drain cleaner with jagged edges and having a first end region first end region having a first side, a second side, a first length, a first end at one end, a second end, and a first tail with a first end connected to the second end of the first end region, a second length of at least 3 inches, a first width with a third length, a first thickness with a fourth length that is no more than half of the third length, and a flexibility sufficient to enable the second length of the first tail to be reversibly bent in a 180 degree arc with a diameter of 1 inch only in a plane perpendicular to a plane containing the first width of the first tail and the second length of the first tail and unable to be reversibly bent in a 180 degree arc with a diameter of 1 inch in a plane parallel to the plane containing the first width of the first tail and the second length of the first tail, and
a head comprising an affixing element comprising a magnetic material with an affixing surface configured to removably affix with magnetic forces to an inanimate magnetically attractable object with sufficient first force to permit retrieval of the inanimate magnetically attractable object and an attaching element affixed to the affixing element of the head and configured to permanently attach the affixing element of the head to the first end region of the body with a second force that is greater than the first force.

2. The inanimate magnetically attractable object retrieval apparatus of claim 1 wherein, the body is a first zip tie with the first end region having at least on the first side a first self-locking opening of the first zip tie converted into an opening with an axis and configured to receive the head so that the strongest magnetic attraction forces are parallel the axis of the opening.

3. The inanimate magnetically attractable object retrieval apparatus of claim 1 wherein, the body is a second zip tie with the first end of the first end region attached to the head so that the strongest attraction forces are parallel the length of the end region.

4. The inanimate magnetically attractable object retrieval apparatus of claim 1 wherein the head attached to the first end region of the body is encapsulated with a plastic material.

5. The inanimate magnetically attractable object retrieval apparatus of claim 4 wherein the plastic material configured to be able to coat the head and first end region is configured to harden into a solid at room temperature and is from a group consisting of thermoplastic or thermoset plastic material.

6. The inanimate magnetically attractable object retrieval apparatus of claim 1 wherein the magnetic material is from a group consisting of the rare earth magnets samarium cobalt or neodymium, alnico, ferrite, and flexible rubber.

7. The inanimate magnetically attractable object retrieval apparatus of claim 1 wherein the body is a first zip tie with a second self-locking opening on the first side and the inanimate magnetically attractable object retrieval apparatus further comprises
    a second zip tie with a second tail, having a second width similar to the first width, a fifth length shorter than the first length, and a second thickness similar to the first configured to attach with the second locking opening of the first zip tie, and a second end region with a second first side that has at least on the second first side a second first self-locking opening converted into a second opening with an axis, and
    an accessory component attachable to the second opening, the accessory component comprising an accessory element and an accessory attaching element comprising the second zip tie with a second tail, having a second width similar to the first axis.

8. The inanimate magnetically attractable object retrieval apparatus of claim 7 wherein the second self-locking opening is releasable, and the accessory component is releasably attachable to the second opening.

9. The inanimate magnetically attractable object retrieval apparatus of claim 7 wherein the accessory component is from a group consisting of an illumination element, a picture conveying element, hook.

10. The inanimate magnetically attractable object retrieval apparatus of claim 1 wherein the body is a first zip tie, and the inanimate magnetically attractable object retrieval apparatus further comprises
    at least one accessory component releasably attachable to the tail near the first end region, the accessory component comprising an accessory element and an accessory attaching element that comprises an accessory attaching structure configured to attach to the tail near the first end region and the accessory element.

11. The inanimate magnetically attractable object retrieval apparatus of claim 1 wherein the head further comprises a hook affixed to the head with a third force greater than the first force used to retrieve the object and configured to releasably attach to the object to enable the object to be retrieved.

12. The inanimate magnetically attractable object retrieval apparatus of claim 1 wherein the body comprises a drain cleaner with a tip as the first end region, the affixing element is a magnet adhered to the tip, and the attaching element is configured to not lose its function of adhering the magnet to the end region with exposure to water.

13. The object retrieval apparatus of claim 1 further comprising a rigid member releasably affixed to at least a portion of the body and at least configured to prevent the head from being adversely attached to another magnetic material before attaching to the magnetically attracted inanimate object.

14. A method of using an inanimate magnetically attractable object retrieval apparatus comprising the steps of
    providing an inanimate magnetically attractable object to be retrieved from a space inaccessible by a hand or fingers of a person;
    providing an inanimate magnetically attractable object retrieval apparatus comprising,
        a body comprising a plastic strip from a group consisting of a fastener for holding items together or a drain cleaner with jagged edges and having a first end region, a second side, a first length, a first end at one end, a second end, and a first tail with a first end connected to the second end of the first end region, a second length of at least 3 inches, a first width with a third length, a first thickness with a fourth length that is no more than half of the third length, and a flexibility sufficient to enable the second length of the first tail to be reversibly bent in a 180 degree arc with a diameter of 1 inch only in a plane perpendicular to a plane containing the first width of the first tail and the second length of the first tail and unable to be reversibly bent in a 180 degree arc with a diameter of 1 inch in a plane parallel to the plane containing the first width of the first tail and the second length of the first tail, and
        a head comprising an affixing element comprising a magnetic material with an affixing surface configured to removably affix with magnetic forces to an inanimate magnetically attractable object with sufficient first force to permit retrieval of the inanimate magnetically attractable object and an attaching element affixed to the affixing element of the head and configured to permanently attach the affixing element of the head to the first end region of the body with a second force that is greater than the first force;
    threading the inanimate magnetically attractable object retrieval apparatus through a passage until the head contacts the inanimate magnetically attractable object and releasably adheres to the inanimate magnetically attractable object;
    withdrawing the inanimate magnetically attractable object retrieval apparatus from the passage with the inanimate magnetically attractable object attached to the head; and
    removing the inanimate magnetically attractable object from the inanimate magnetically attractable object retrieval apparatus.

15. The method of using an inanimate magnetically attractable object retrieval apparatus of claim 14 wherein the body is a first zip tie with a second self-locking opening on the first side and the inanimate magnetically attractable object retrieval apparatus further comprises
    a second zip tie with a second tail having a second width similar to the first width, a fifth length shorter than the first length, and a second thickness similar to the first thickness where the second tail is configured to releasably attach with the second self-locking opening of the first zip tie, and a second end region with a second first side that has at least on the second first side a second first self-locking opening converted into a second opening with an axis, and
    an accessory component attachable to the second opening, the accessory component comprising an accessory element and an accessory attaching element that comprises an accessory attaching structure comprising the second opening with an axis of the second zip tie; and
the method further comprises the steps of
attaching the accessory component to the second self-locking opening and using the accessory component to assist retrieving the inanimate magnetically attractable object.

16. The method of using an inanimate magnetically attractable object retrieval apparatus of claim 15 wherein the second self-locking opening is releasable, the accessory component is releasably attachable, and the method further comprises the two steps of removing the accessory component from the apparatus and reattaching the accessory to another inanimate magnetically attractable object retrieval apparatus to retrieve an inanimate magnetically attractable object more easily.

17. The method of using an inanimate magnetically attractable object retrieval apparatus of claim 15 wherein the accessory component is a source of illumination to provide illumination in a location where the inanimate magnetically attractable object is thought to be located before releasably adhering the head to the inanimate magnetically attractable object.

18. The method of using an inanimate magnetically attractable object retrieval apparatus of claim 14 wherein the body is a first zip tie, and the inanimate magnetically attractable object retrieval apparatus further comprises an accessory component releasably attachable to the tail near the first end region, the accessory component comprising an accessory element and an accessory attaching element that comprises an accessory attaching structure configured to attach to the tail near the first end region to the accessory element; and the method further comprises the steps of providing an accessory component, and attaching the accessory component to the tail of the first zip tie near the first end region.

19. The method of using an inanimate magnetically attractable object retrieval apparatus of claim 14 wherein the inanimate magnetically attractable object is the first end of a wire or a magnetically attractable clip that is attached to the first end of the wire, and the passage is in a conduit with a first end, a second end, and a bend, and the method further comprises the steps of threading the tip of the wire into the first end of the conduit before the bend;

threading the head into the second end of the conduit past the bend until the head is releasably adhered to the first end of the wire; and pulling the inanimate magnetically attractable object retrieval apparatus releasably adhered to the first end of the wire through the second end of the conduit.

20. The method of using an inanimate magnetically attractable object retrieval apparatus of claim 14 further comprising the step of releasably attaching a rigid member to at least a portion of the body to provide rigidity of the inanimate magnetically attractable object retrieval apparatus as it passes areas along the passage that adversely may be magnetically attracted to the head.

* * * * *